United States Patent [19]

Toshioka et al.

[11] 3,948,338

[45] Apr. 6, 1976

[54] POWER STEERING APPARATUS

[75] Inventors: Tohru Toshioka, Toyota; Minoru Kawabata, Aichi; Toshimaso Miyata, Kariya, all of Japan

[73] Assignee: Toyoda Koki Kabushiki Kaisha, Japan

[22] Filed: Dec. 27, 1974

[21] Appl. No.: 536,798

[30] Foreign Application Priority Data

Dec. 28, 1973  Japan.................................. 49-3188
Dec. 28, 1973  Japan.................................. 49-3189

[52] U.S. Cl................. 180/79.2 R; 91/437; 91/458
[51] Int. Cl.²............................................ B62D 5/08
[58] Field of Search.......... 180/79.2 R; 91/437, 438, 91/439, 458, 459, 361

[56] References Cited
UNITED STATES PATENTS

| | | | |
|---|---|---|---|
| 2,221,365 | 11/1940 | Ware | 91/459 X |
| 2,341,502 | 2/1944 | Ingres | 180/79.2 R |
| 2,364,917 | 12/1944 | Ray | 91/361 |
| 3,693,747 | 9/1972 | Inoue | 180/79.2 R |
| 3,744,515 | 7/1973 | Inove | 180/79.2 R |
| B310,149 | 1/1975 | Sugisawa | 180/79.2 R |

*Primary Examiner*—Robert R. Song
*Assistant Examiner*—John A. Pekar
*Attorney, Agent, or Firm*—Oblon, Fisher, Spivak, McClelland & Maier

[57] ABSTRACT

A power steering apparatus for a vehicle comprising: a hydraulic actuator for supplementing manual steering torque; a first valve means for controlling directions of pressure fluid supplied to the hydraulic actuator in response to manual steering; a second valve means for reducing the supplementing force of the hydraulic actuator by by-passing the pressure fluid; a vehicle speed detecting means for detecting the cruising speed of the vehicle; first switching means responsive to the vehicle speed detecting means for supplying electric energy to the second valve means when the cruising speed exceeds a predetermined value; and second switching means for decreasing electric energy supplied to the second valve means when the second valve means starts to by-pass the pressure fluid.

8 Claims, 8 Drawing Figures

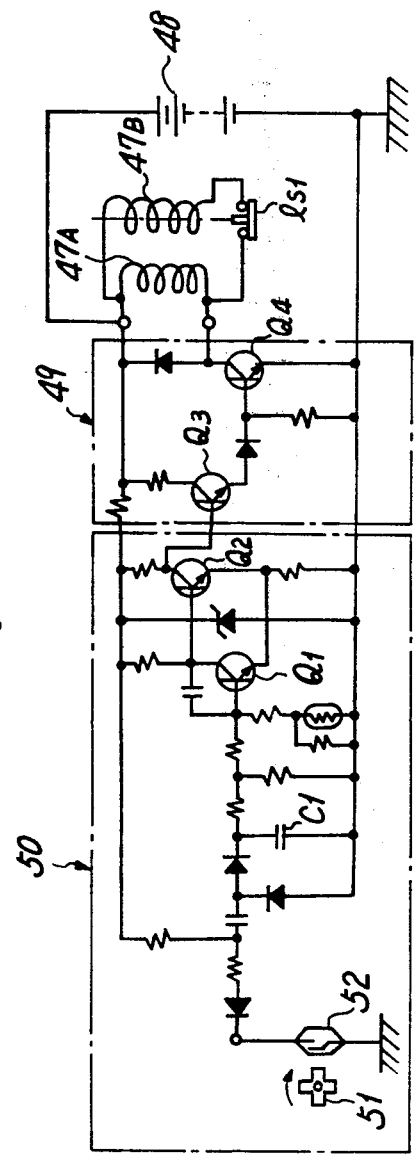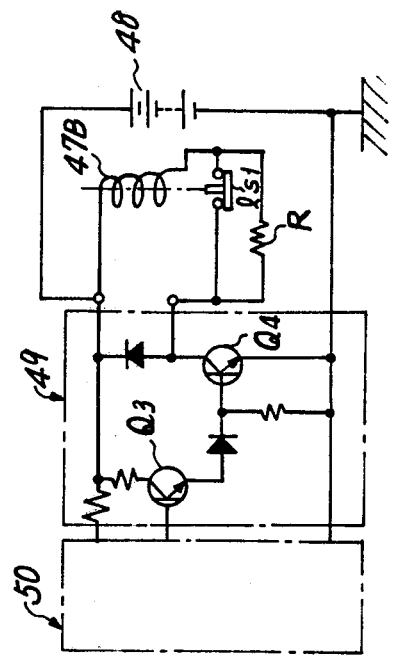
Fig.3
Fig.4

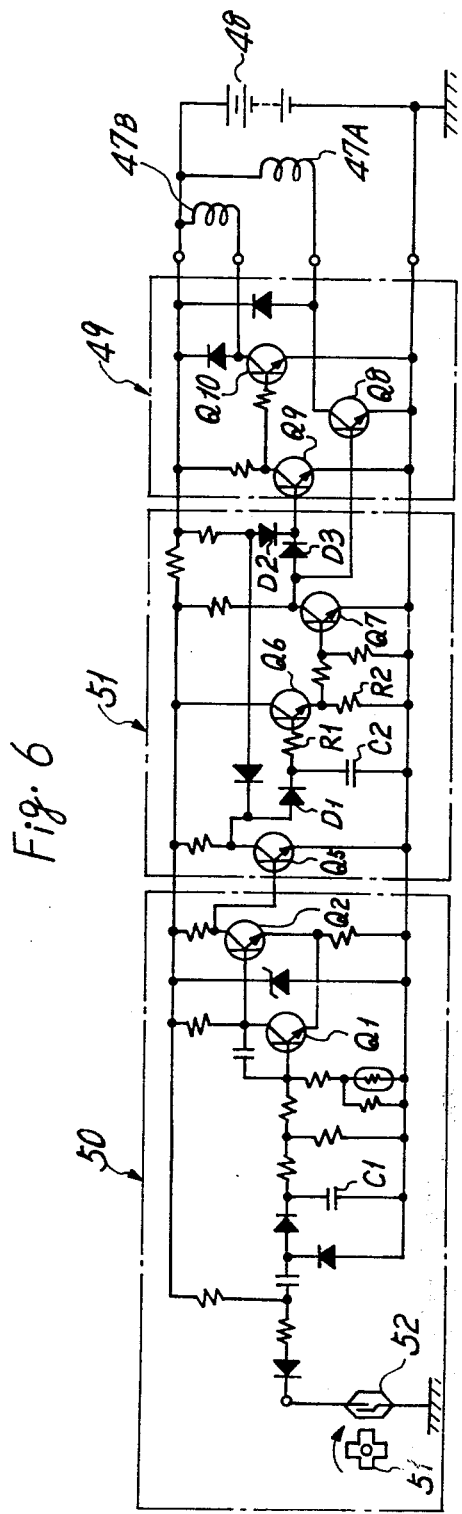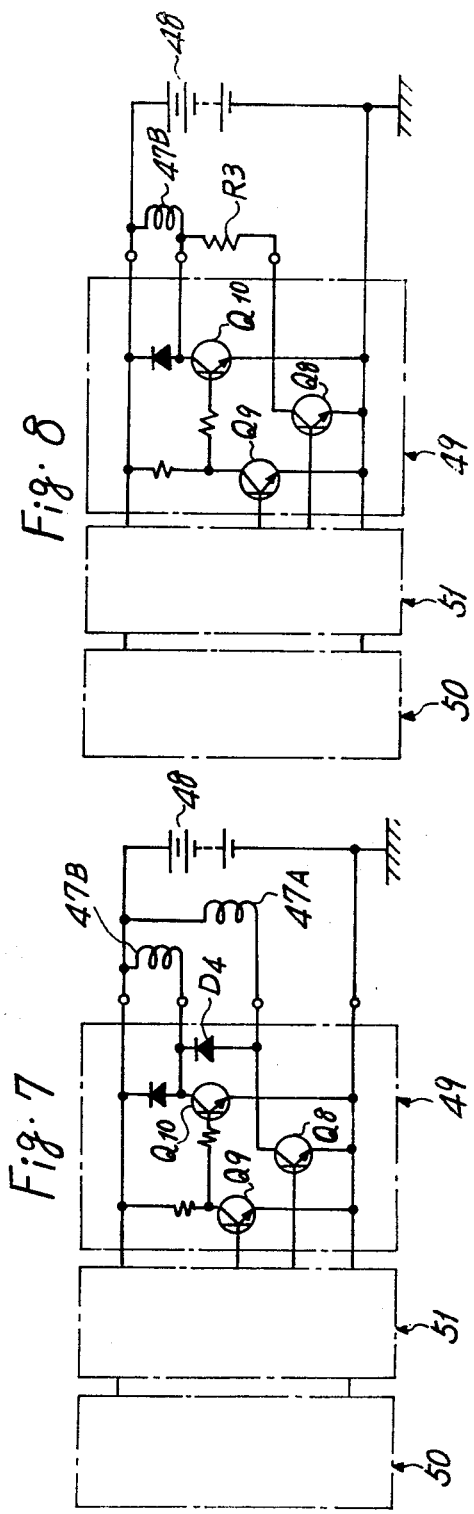

POWER STEERING APPARATUS

BACKGROUND OF THE INVENTION

1. Field of the Invention

The present invention relates to a power steering apparatus and, more particularly, to an improved power steering apparatus wherein the pressure fluid supplied to a hydraulic actuator is controlled in response to the cruising speed of the vehicle.

2. Description of the Prior Art

In a recently developed power steering apparatus, a by-pass passage connecting both chambers of the hydraulic actuator is opened to decrease steering gain at the high cruising speed of the vehicle so that high cruising speed can be safely achieved. If the opening and closing of the by-pass passage is controlled by a solenoid valve, the temperature thereof is elevated when the same is operated for an extended time. Therefore, the resistance of the coil or coils of the solenoid valve is increased. Accordingly, when the high speed drive is restarted during a long distance drive after a temporary stop, an attractive force strong enough for proper operation is not effected because the resistance of the coil has been increased with the result that not enough current can be passed therethrough.

It should be noted that it is quite difficult to use a large capacity solenoid valve because of the undesirable power consumption increase and because the space for the solenoid valve is limited.

Furthermore, at the start of operation, a strong force is required because the magnetic flux is weakened by the space between a movable iron core and a stationary iron core of the solenoid. However, after the spool of the solenoid valve has been displaced to the retraction end thereof, the spool is maintained in this position by a small force.

SUMMARY OF THE INVENTION

It is, therefore, an object of the present invention to provide a power steering apparatus for preventing misoperation caused by the decrease of attractive force of a solenoid valve.

Another object of the present invention is to provide a power steering apparatus wherein electric current supplied to a solenoid valve is decreased after completion of operation.

A further object of the present invention is to provide a power steering apparatus which is small in construction and reliable in operation.

The foregoing and other objects are attained in accordance with one aspect of the invention through the provision of a power steering apparatus comprising: a hydraulic actuator for supplementing manual steering torque; a first valve means for controlling directions of pressure fluid supplied to the hydraulic actuator in response to manual steering; a second valve means for reducing the supplementing force of the hydraulic actuator by by-passing the pressure fluid; a vehicle speed detecting means for detecting a cruising speed of the vehicle; first switching means responsive to the vehicle speed detecting means for supplying electric energy to the second valve means when the cruising speed has exceeded a predetermined value; and second switching means for decreasing electric energy supplied to the second valve means when the same has started to by-pass the pressure fluid.

BRIEF DESCRIPTION OF THE DRAWINGS

Various objects, features and attendant advantages of the invention will be more fully appreciated as the same becomes better understood from the following detailed description of the invention when considered in connection with the accompanying drawings, wherein:

FIG. 3 shows an electric circuit for controlling a solenoid valve in response to the cruising speed of a vehicle;

FIG. 4 shows another electric circuit for controlling the solenoid valve;

FIG. 6 shows an electric circuit for controlling a solenoid valve such as shown in FIG. 5;

FIG. 7 shows another electric circuit for controlling a solenoid valve such as shown in FIG. 5; and FIG. 8 shows still another electric circuit for controlling a solenoid valve such as shown in FIG. 5.

DETAILED DESCRIPTION OF THE PREFERRED EMBODIMENTS

Figure 1:
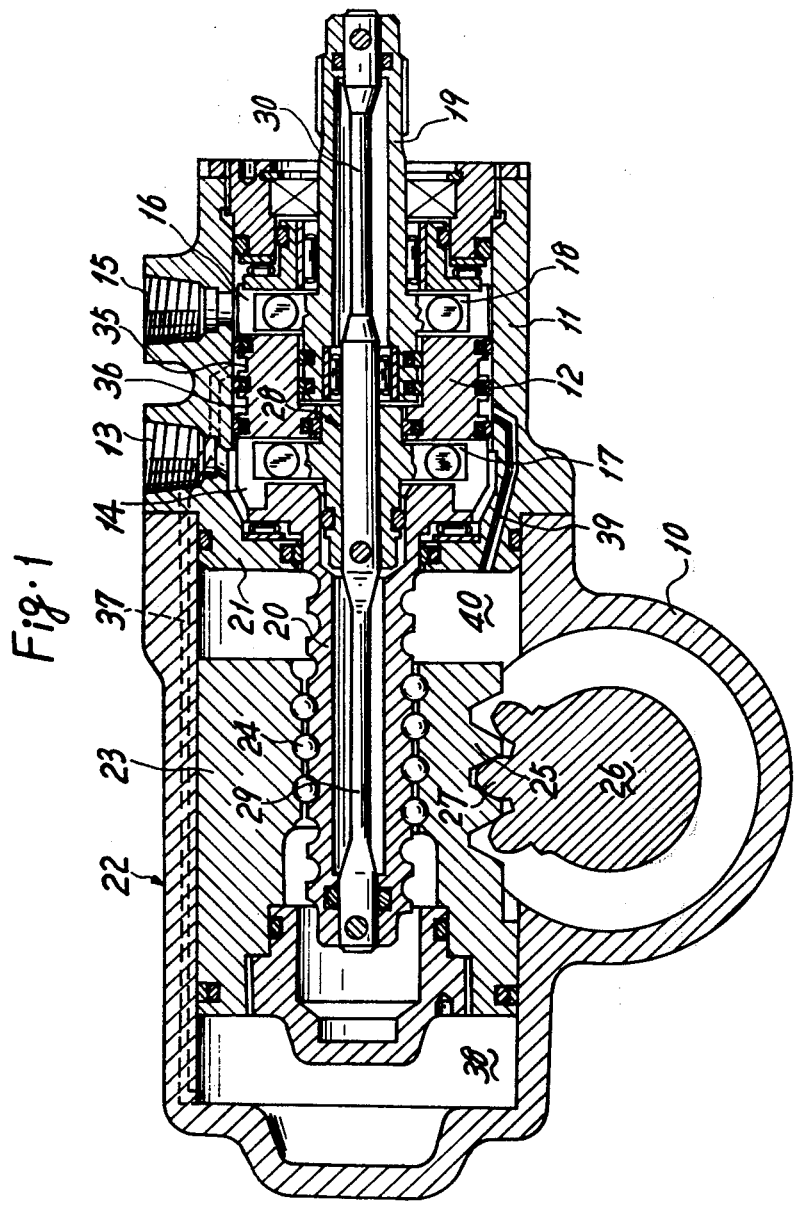
FIG. 1 is a cross sectional view of a power steering apparatus.

Referring now to the drawings, wherein like reference numerals refer to identical or corresponding parts throughout the several views, there is shown in FIG. 1, one example of a power steering apparatus having a flap valve servo-mechanism.

Fixedly mounted on a body 10 of the power steering apparatus is a servo valve housing 11 in which a rotary valve 12 is rotatably mounted. First and second valve chambers 14, 16 which are respectively connected to inlet and outlet ports 13, 15 are provided at the both ends of the rotary valve 12. First and second flap valves 17, 18 are rotatably contained in the first and second valve chambers 14, 16. The second flap valve 18 is integrally connected to a steering rod 19 which is, in turn, connected to a steering handle through a handle column (not shown).

A screw rod 20 is integrally connected to one end of the rotary valve 12. The rod extends into a hydraulic actuator 22 through a partition 21. Slidably contained in the hydraulic actuator 22 is a piston 23 with which the screw rod 20 is threadedly engaged through balls 24.

Figure 2:
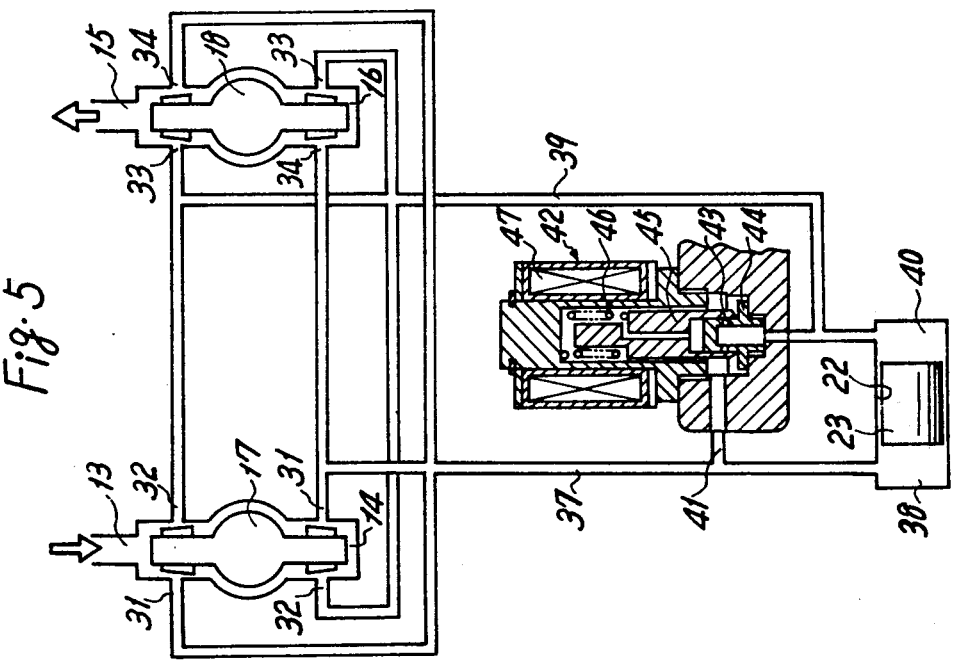
FIG. 2 shows a hydraulic circuit for the power steering apparatus.

A rack 25 formed on the piston 23 is meshed with a sector gear 27 provided on a cross shaft 26 which is, in turn, connected through a steering link mechansim (not shown) to the dirigible wheels of a vehicle. The screw rod 20, the first flap valve 17 and the steering rod 19 are connected by a dual torsion bar 28 which has first and second resilient portions 29, 30. Distribution ports 31, 32 and injection ports 33, 34 are respectively opened facing both surfaces of the first and second flap valves 17, 18 in the first and second valve chambers 14, 16 (FIG. 2). The distribution ports 31, 32 are connected with the injection ports 33, 34 through conduits formed in the rotary valve 12. Annular grooves 35, 36 (FIG. 1) formed on the rotary valve 12 are connected to the distribution ports and the injection ports. The annular grooves 35, 36 are further connected to left and right chambers 38, 40 of the hydraulic actuator 22 through conduits 37, 39, respectively.

The left and right chambers 38, 40 of the hydraulic actuator 22 are connected with each other through a by-pass passage 41 on which a solenoid valve 42 mounted on the body 10 is provided. A movable iron core 45 which is telescopically engaged with a fixed valve 44 having a throttling orifice 43 is normally urged by the force of a compression spring 46 in the direction to close the throttling orifice. When the coil 47 is energized, the movable iron core 45 is moved to the retraction end against the force of the spring 46 so that both chambers of the hydraulic actuator 22 are connected with each other through the by-pass passage 41 by opening the orifice 43. A limit switch LS1 is actuated by the movable iron core 45 when the core 45 has been moved to the retraction end.

The electric control circuit is described with reference to FIG. 3.

A vehicle speed detecting device 50 detects the cruising speed of a vehicle. The vehicle speed detecting device 50 comprises a reed switch 52 for generating pulse signals proportional in frequency to the vehicle cruising speed through the aid of a magnet 51 rotated by an output shaft from the transmission of the vehicle, a frequency-voltage converting circuit including a condenser C1 to accumulate the electricity of the voltage proportional to the frequency of the pulse signals and a Schmidt circuit including transistors Q1, Q2 which become conductive and non-conductive respectively when the cruising speed has exceeded a predetermined value.

A switching device 49 is responsive to the vehicle speed detecting device 50 and comprises transistors Q3, Q4. A pair of coils 47A, 47B which are connected with each other in parallel through a normally closed contact $ls1$ of the limit switch LS1 are connected to a battery 48 through the switching device 49.

When the cruising speed is lower than a predetermined value, the transistor Q2 of the Schmidt circuit remains conductive because the condenser C1 cannot increase the voltage high enough to make the transistor Q1 conductive due to the low frequency of the pulse signals from the reed switch 52. Therefore, the base voltage of the transistor Q2 is high. In consequency, thereof, the transistors Q3, Q4 remain non-conductive resulting in non-energization of coils 47A, 47B.

When the predetermined value is exceeded, the transistor Q2 becomes non-conductive and the transistors Q3, Q4 become conductive. Accordingly, coils 47A and 47B are energized so as to move the movable iron core 45 by the strong attractive force bacause the normally closed contact $ls1$ of the limit switch LS1 remains closed in the initial stage of the solenoid valve 42. When the movable iron core 45 is moved to the retraction end thereof so as to open the normally closed contact $ls1$ of the limit switch LS1, the coil 47B is de-energized and, thus, the movable iron core 45 is maintained at the retraction end thereof only by means of the coil 47A.

FIG. 4 is a view similar to that of FIG. 3 showing, however, another electric control circuit.

In this electric control circuit, a resistance R which is a substitute for the coil 47A is provided between the coil 47B and the collector of the transistor Q4 in parallel with the normally closed contact $ls1$ of the limit switch LS1. Accordingly, when the transistor Q4 becomes conductive due to a cruising speed in excess of the predetermined value, a large quantity of electric current is supplied to the coil 47B through the normally closed contact $ls1$. However, when the normally closed contact $ls1$ is opened, the quantity of the electric current is reduced, to a small amount by the resistance R.

The operation of the invention will be described with respect to the electric control circuit shown in FIG. 3.

When the first and second flap valves 17, 18 are maintained in a neutral position as shown in FIG. 2, the pressurized fluid supplied to the first valve chamber 14 is distributed equally into the distribution ports 31, 32 and is discharged into the second valve chamber 16 from the injection ports 33, 34. When the first and second flap valves 17 and 18 are turned in a clockwise direction (FIG. 2) by a manual steering torque, the pressurized fluid supplied into the first valve chamber 14 is distributed only into the distribution port 31, and is then directed to the injection port 34. However, in this case, the injection port 34 is closed by the second flap valve 18 and, thus, the pressure of the fluid in the conduits is increased. Accordingly, the pressurized fluid is supplied to the left chamber 38 of the hydraulic actuator 22 through the annular groove 35 and the conduit 37 to move the piston 23 toward the right (FIG. 2) whereby the dirigible wheels are turned right through the cross shaft 26 and its associated steering link mechanism.

When the cruising speed exceeds the predetermined value, the transistor Q1 becomes conductive because the condenser C1 is charged to a predetermined voltage through the aid of the reed switch 52. Therefore, the state of the transistor Q2 is changed into non-conductive, and, thus, the states of the transistors Q3 and Q4 are changed into conductive so that an ample electric current is supplied through the coils 47A, 47B at the start of the movable iron core 45. When the movable iron core 45 has been moved to the retraction end thereof, the limit switch LS1 is actuated to open the normally closed contact $ls1$ holding the movable iron core 45 at the retraction end only by means of the coil 47A.

With respect to the control circuit shown in FIG. 4, the operation is performed in the same manner as described with relation to the control circuit shown in FIG. 3 except that the electric current through the coil 47B is restricted by the resistance R when the movable iron core 45 is moved to the retraction end.

Consequently, even if high speed drive occurs for an extended time, the attractive force at the start of the operation is not decreased because the temperature rise of the coil is prevented by decreasing the electric current through the coil or coils.

Figure 5:
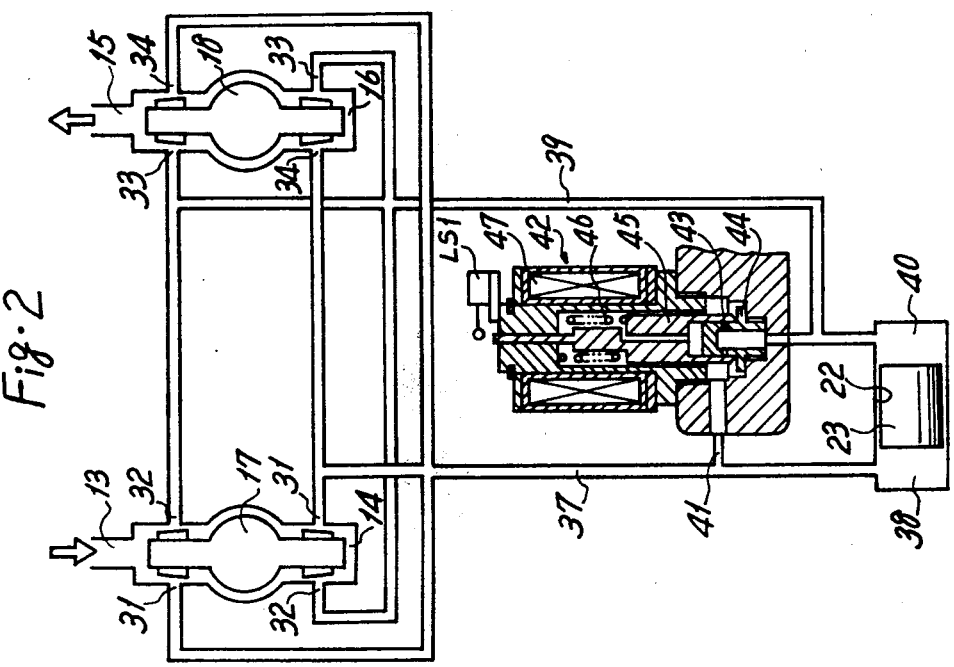
FIG. 5 is a view similar to that of FIG. 2 showing another embodiment of the invention.

Another embodiment will be described with reference to FIGS. 5, 6 and 7 in which a timing device 51 is energized when the vehicle cruising speed exceeds a predetermined value. When a predetermined time elapses after the energization of the timing device, the electric current through the coil or coils is decreased. Therefore, in this embodiment, the limit switch LS1 and its normally closed contact are not provided as shown in FIG. 5.

When the vehicle cruising speed is lower than a predetermined value, the transistor Q2 of the vehicle speed detecting device 50 remains conductive and therefore transistor Q5 of the timer device 51 remains non-conductive. In this situation, a condenser C2 is charged through a diode D1 and therefore, transistors Q6 and Q7 are conductive. Accordingly, the voltage at the base of transistor Q8 is low and, thus, coil 47A is not energized. Transistor Q9 is conductive because electric voltage is applied to the base thereof through diode D2. Therefore, transistor Q10 remains non-conductive so that coil 47B is not energized.

When the vehicle cruising speed exceeds the predetermined value, transistor Q2 becomes non-conductive and transistor Q5 becomes conductive. However, transistor Q7 remains conductive until condenser C2 discharges through resistances R1, R2 to reduce the voltage at the emitter of transistor Q6. When transistor Q5 becomes conductive, transistor Q9 becomes non-conductive rendering transistor Q10 conductive and thus, coil 47B is energized.

After a predetermined period has elapsed, the electricity contained in condenser C2 is discharged and, thus, the emitter voltage of transistor Q6 is decreased so that transistor Q7 becomes non-conductive. Accordingly, transistors Q8 and Q10 become conductive and non-conductive to hold the movable iron core 45 at the retraction end by energizing coil 47A instead of coil 47B.

It is to be noted that coil 47B is larger in capacity than coil 47A.

FIG. 7 shows another embodiment wherein vehicle speed detecting device 50 and time device 51 are the same as those of FIG. 6 but a diode D4 is provided between coils 47A and 47B. Therefore, both coils 47A and 47B are energized when transistor Q10 becomes conductive due to a vehicle cruising speed in excess of the predetermined value. However, when condenser C2 has been discharged after the predetermined period, transistor Q8 becomes conductive and transistor Q10 becomes non-conductive. Accordingly, at this time, only coil 47A is energized by the aid of diode D4.

FIG. 8 is a view similar to those of FIGS. 6, 7 showing another embodiment wherein a resistance R3 is provided between coil 47B and the collector of transistor Q8. After the vehicle cruising speed has exceeded the predetermined value, transistor Q10 becomes conductive and, thus, movable iron core 45 is completely retracted by the energization of coil 47B. After the predetermined period has elapsed, transistor Q7 becomes non-conductive to make transistor Q8 and transistor Q10 conductive and non-conductive respectively. Thus, a small quantity of electric current is supplied to coil 47B through resistance R3 to hold movable iron core 45 at the retraction end thereof.

Accordingly to the invention, as described in detail, the solenoid valve is provided for controlling the by-pass passage connecting the two hydraulic chambers of the hydraulic actuator in response to the cruising speed of the vehicle. When the movable iron core is moved to the retraction end thereof by the energization of the coil means of the solenoid valve, the switch is actuated to reduce the electric current supplied to the coil. Therefore, the movable iron core is moved by supplying ample electric current at the initiation of the retraction thereof, and, upon the completion of the retraction, the electric current is reduced in order to prevent a temperature rise of the coil whereby the mis-operation due to the reduction of the attractive force is prevented to increase the safety factor at high cruising speed and to reduce the consumption of energy.

Obviously, many modifications and variations of the invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A power steering apparatus for a vehicle comprising:
   a hydraulic actuator for supplementing manual steering torque;
   a first valve means for controlling directions of pressure fluid to be supplied to the hydraulic actuator in response to manual steering;
   a second valve means including a movable core for reducing the supplemental force of the hydraulic actuator by by-passing the pressure fluid, the second valve means including first and second elements for retracting the movable core to open a by-pass passage and for controlling electric current therethrough;
   a vehicle speed detecting means for detecting the cruising speed of the vehicle;
   first switching means responsive to the vehicle speed detecting means for supplying electric current to said first and second elements of the second valve means so as to open the by-pass passage when the cruising speed exceeds a predetermined value; and
   second switching means capable of causing the first and second elements to decrease the electric current therethrough when the second valve means starts to by-pass the pressure fluid.

2. A power steering apparatus according to claim 1 wherein the second switching means is a limit switch which is actuated by the movable core when the movable core opens the by-pass passage.

3. A power steering apparatus according to claim 2 wherein the first and second elements are first and second coils respectively which are connected in parallel with each other through a contact of the limit switch, one of the first and second coils being de-energized by opening the contact when the limit switch is actuated.

4. A power steering apparatus according to claim 2, wherein the first and second elements are coil and resistance respectively, the coil being connected in series to the resistance which is connected in parallel with a contact of the limit switch.

5. A power steering apparatus according to claim 1, wherein the second switching means is a timing means connected to the first switching means for generating a first signal to supply the electric current to the second valve means when the cruising speed exceeds a predetermined value and a second signal to decrease the electric current to the second valve means when a predetermined period elapses after the first signal.

6. A power steering apparatus according to claim 5 wherein the first and second elements are respectively first and second coils, the first switching means being operable to energize the first coil in response to the first signal and being operable to energize the second coil instead of the first coil in response to the second signal.

7. A power steering apparatus according to claim 5 wherein the first and second elements are respectively first and second coils, the first switching means being operable to energize the first and second coils in response to the first signal and to de-energize one of the first and second coils in response to the second signal.

8. A power steering apparatus according to claim 5 wherein the first and second elements are coil and resistance respectively, the coil being connected in series with the resistance, the first switching means being operable to supply electric energy to the coil through the resistance in response to the second signal.

\* \* \* \* \*